US012791171B2

(12) United States Patent
Gao et al.

(10) Patent No.: US 12,791,171 B2
(45) Date of Patent: Nov. 10, 2026

(54) MULTI-LAMP SPLICING APPARATUS AND MULTI-LAMP LIGHTING DEVICE

(71) Applicant: Aputure Imaging Industries Co., Ltd., Shenzhen (CN)

(72) Inventors: Chao Gao, Shenzhen (CN); Yi Xie, Shenzhen (CN)

(73) Assignee: Aputure Imaging Industries Co., Ltd., Shenzhen (CN)

( * ) Notice: Subject to any disclaimer, the term of this patent is extended or adjusted under 35 U.S.C. 154(b) by 369 days.

(21) Appl. No.: 18/396,427

(22) Filed: Dec. 26, 2023

(65) Prior Publication Data

US 2024/0125460 A1 Apr. 18, 2024

Related U.S. Application Data

(63) Continuation of application No. PCT/CN2022/132530, filed on Nov. 17, 2022.

(30) Foreign Application Priority Data

Dec. 29, 2021 (CN) ......................... 202111627189.3

(51) Int. Cl.
*F21V 21/005* (2006.01)
*F16B 7/18* (2006.01)
(Continued)

(52) U.S. Cl.
CPC ............ *F21V 21/005* (2013.01); *F16B 7/185* (2013.01); *F21S 2/005* (2013.01); *F21V 21/14* (2013.01)

(58) Field of Classification Search
CPC .... E04B 1/1903; E04B 1/1906; E04B 1/1912; E04B 2001/1915; E04B 2001/1918;
(Continued)

(56) References Cited

U.S. PATENT DOCUMENTS 5,116,193 A * 5/1992 Takizawa .............. E04B 1/1906 403/171
6,494,595 B1 12/2002 Lin
(Continued)

FOREIGN PATENT DOCUMENTS

CN 202852537 U 4/2013
CN 203205603 U 9/2013
(Continued)

OTHER PUBLICATIONS

International Search Report in International application No. PCT/CN2022/132530, mailed on Jan. 29, 2023.
(Continued)

*Primary Examiner* — Josh Skroupa
(74) *Attorney, Agent, or Firm* — PV IP PC; Wei Te Chung

(57) ABSTRACT

The multi-lamp splicing apparatus includes a supporting base provided with several supporting surfaces; and a connector disposed on at least one of the supporting surfaces. The connector includes a support and a locking gear. The support and the corresponding one of the supporting surfaces form a first limiting space, and the locking gear is rotatably disposed in the first limiting space. The locking gear is provided with a locking column or a locking hole for connecting a lamp.

18 Claims, 12 Drawing Sheets

(51) Int. Cl.
*F21S 2/00* (2016.01)
*F21V 21/14* (2006.01)

(58) Field of Classification Search
CPC ..... E04B 2001/1921; E04B 2001/1957; E04B 2001/196; E04B 2001/2406; F16B 7/185; F21L 4/04; F21S 2/005; F21V 21/005; F21V 21/14; Y10T 403/34; Y10T 403/341; Y10T 403/342; Y10T 403/343; Y10T 403/344; Y10T 403/345; Y10T 403/346; Y10T 403/347; Y10T 403/349
USPC ....... 403/169, 170, 171, 172, 173, 174, 175, 403/176, 178
See application file for complete search history.

(56) References Cited

U.S. PATENT DOCUMENTS

| | | | | |
|---|---|---|---|---|
| 7,494,244 | B1 | 2/2009 | Van Diep | |
| 10,244,864 | B2 * | 4/2019 | Bensen | E04B 1/1912 |
| 2019/0178276 | A1 * | 6/2019 | Hansen | E04B 1/1903 |

FOREIGN PATENT DOCUMENTS

| | | | | | |
|---|---|---|---|---|---|
| CN | 103791468 | A | | 5/2014 | |
| CN | 106895288 | A | | 6/2017 | |
| CN | 209165088 | U | | 7/2019 | |
| CN | 110260222 | A | * | 9/2019 | F21V 21/005 |
| CN | 210088622 | U | | 2/2020 | |
| CN | 210800785 | U | | 6/2020 | |
| CN | 211502460 | U | | 9/2020 | |
| CN | 212841046 | U | | 3/2021 | |
| CN | 213023883 | U | | 4/2021 | |
| CN | 113566172 | A | | 10/2021 | |
| CN | 214467971 | U | | 10/2021 | |
| CN | 214751254 | U | | 11/2021 | |
| CN | 114001330 | A | | 2/2022 | |
| DE | 3413546 | A1 | * | 10/1985 | E04B 1/19 |
| DE | 20203467 | U1 | | 6/2002 | |
| DE | 202019102022 | U1 | * | 4/2019 | F16B 7/187 |
| FR | 3004474 | A1 | * | 10/2014 | E04B 1/19 |
| GB | 1154676 | A | | 6/1969 | |
| WO | 2017126911 | A1 | | 7/2017 | |
| WO | WO-2019024968 | A1 | * | 2/2019 | F16B 7/185 |

OTHER PUBLICATIONS

Written Opinion of the International Search Authority in International application No. PCT/CN2022/132530, mailed on Jan. 29, 2023.

* cited by examiner

MULTI-LAMP SPLICING APPARATUS AND MULTI-LAMP LIGHTING DEVICE

CROSS-REFERENCE TO RELATED APPLICATIONS

This application is a continuation of International Application No. PCT/CN2022/132530, filed on Nov. 17, 2022, which claims priority to Chinese Patent Application No. 202111627189.3 filed on Dec. 29, 2021. The disclosures of the aforementioned applications are incorporated herein by reference in their entireties.

TECHNICAL FIELD

The present disclosure relates to the field of lighting device technologies, and in particular, to a multi-lamp splicing apparatus and a multi-lamp lighting device.

BACKGROUND

Currently, a creating process of films and television, advertisements, and videos involves lighting photographed objects or scenes. Due to variability of the photographed scenes and objects, one device often cannot meet photographing requirements. A plurality of lights often need to be built, combined, and spliced into more regular or representative shapes for effect and atmosphere rendering. Therefore, sometimes a plurality of lamps need to be spliced together to facilitate desired lighting.

However, commercial connectors usually are not conducive to flexible splicing of lamps, and are not conducive to quickly and conveniently adjusting different arrangements, splicing modes, and light angles of the plurality of lamps, resulting in poor compatibility.

SUMMARY

According to a first aspect, the present disclosure provides a multi-lamp splicing apparatus. The multi-lamp splicing apparatus includes a supporting base provided with several supporting surfaces; and a connector disposed on at least one supporting surface. The connector includes a support and a locking gear. The support and a corresponding supporting surface form a first limiting space, and the locking gear is rotatably disposed in the first limiting space. The locking gear is provided with a locking column or a locking hole for connecting a lamp.

According to a second aspect, the present disclosure further provides a multi-lamp lighting device, including a lamp and the foregoing multi-lamp splicing apparatus. The lamp is connected to the locking column or the locking hole.

REFERENCE SIGNS

Figure 1:
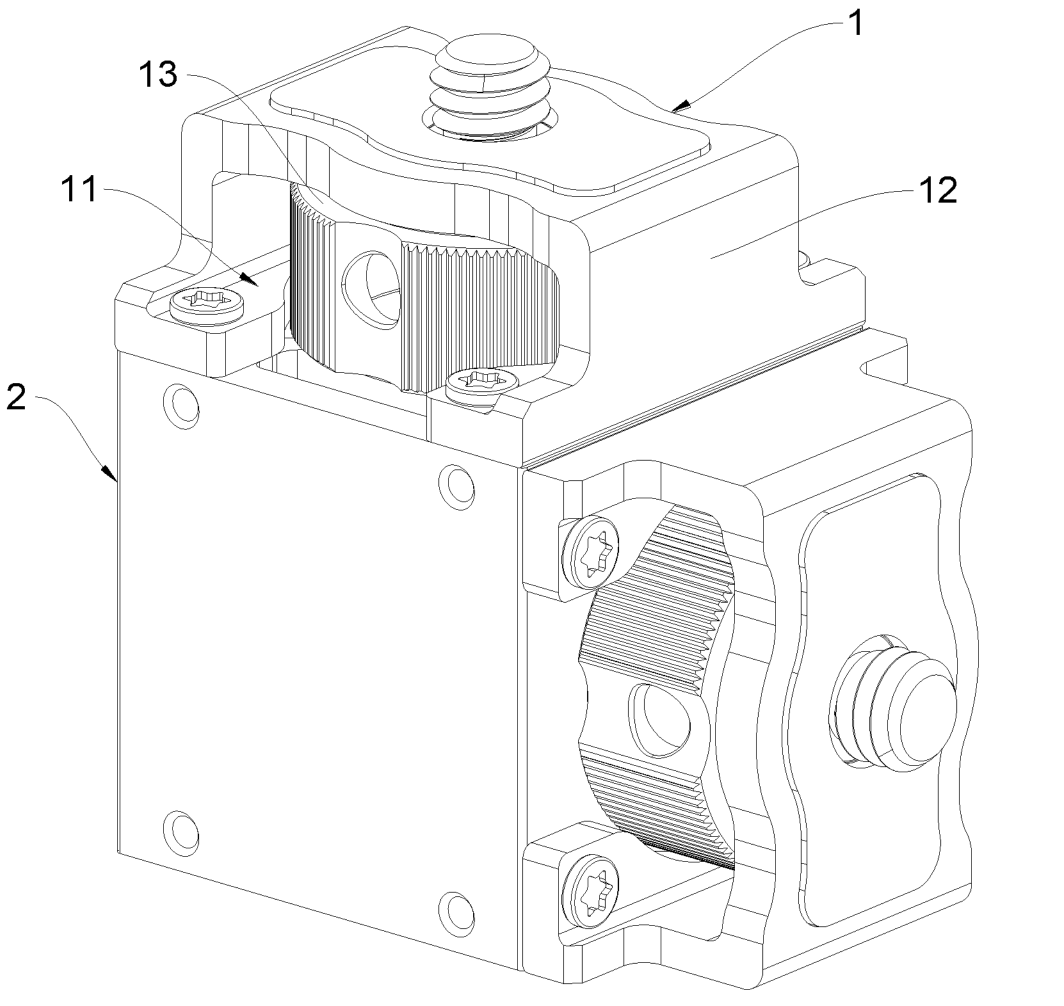
FIG. 1 is a schematic diagram of a multi-lamp splicing apparatus with two connectors according to Embodiment 1 of the present disclosure.

1—connector, 11—first limiting space, 12—support, 121—abutting plate, 122—supporting plate, 123—base, 124—arc-shaped notch, 125—groove, 126—gasket, 127—second fixing hole, 128—fastener, 129—through hole, 13—locking gear, 131—locking column, 132—friction pattern, 133—toggle groove, 134—insertion hole, 135—step, 2—supporting base, 21—supporting surface, 211—first fixing hole, 22—baffle, 221—third fixing hole, 3—lamp, 4—support column.

DETAILED DESCRIPTION

For better understanding and implementation, the technical solutions in the embodiments of the present disclosure are clearly and completely described below with reference to the accompanying drawings in the embodiments of the present disclosure.

In the description of the present disclosure, it should be noted that orientation or position relationships indicated by the terms such as “on”, “below”, “front”, “back”, “left”, “right”, “vertical”, “horizontal”, “top”, “bottom”, “inside”, and “outside” are based on orientation or position relationships shown in the accompanying drawings, and are used merely for ease of describing the present disclosure and simplifying the description, rather than indicating or implying that the mentioned apparatus or component needs to have a particular orientation or needs to be constructed and operated in a particular orientation. Therefore, such terms should not be construed as a limitation of the present disclosure.

Embodiment 1

Embodiment 1 of the present disclosure specifically discloses a multi-lamp splicing apparatus. Refer to FIGS. 1 to 10.

FIGS. 1 to 4 are schematic diagrams of structures of multi-lamp splicing apparatuses with two, three, four or six connectors 1 in sequence. With reference to FIGS. 1 to 4, the present disclosure provides a multi-lamp splicing apparatus, including a supporting base 2 and a connector 1. The supporting base 2 may be a prism, a pyramid, a cylinder, a polyhedron, or the like, for example, may be a cube, a cuboid, a triangular pyramid, a regular hexahedron, a regular octahedron, a regular dodecahedron, or the like. The supporting base 2 is provided with several supporting surfaces 21. The connector 1 is disposed on at least one supporting surface 21. There may be one or more connectors 1. The supporting base 2 includes a top surface, a bottom surface and several circumferential side surfaces. The top surface, the bottom surface and the circumferential side surfaces are the supporting surfaces 21. It may be understood that the supporting surface 21 may be a structure with a supporting function. The supporting surface 21 herein may be a plane, for example, may be a complete plane, a plane formed with a hollow center and a frame support, or the like. The supporting surface 21 may be broadly understood, as long as the supporting surface can support and fix other members, such as the connector 1. The several supporting surfaces 21 are located at different positions of the supporting base 2. In other words, orientations of the several supporting surfaces 21 may be different. Certainly, in other embodiments, the supporting surface 21 may alternatively be a curved surface, such as a convex curved surface.

Optionally, a preset included angle may be formed between several supporting surfaces 21, such as 45 degrees, 60 degrees, 90 degrees, or 120 degrees. The several supporting surfaces 21 may be perpendicular to each other. For example, each supporting surface 21 is perpendicular to an adjacent supporting surface 21. Certainly, only part of the supporting surfaces 21 may be perpendicular to each other. Sizes of the several supporting surfaces 21 may be same or roughly same, for example, the supporting surfaces all have fixed holes with same areas. This facilitates mounting of a lamp 3, thereby achieving a more regular entire structure and more uniform lighting. Certainly, the supporting base 2 may alternatively be provided with supporting surfaces 21 with different sizes. In this case, the connector 1 may alternatively be a connector 1 with a corresponding size, as long as the connector 1 can be fixed on the supporting surface 21. Details are not specifically limited herein.

Optionally, the supporting surface 21 may be configured as a complete plate, or may be configured as a frame with a hollow middle portion and a supporting structure left around. Certainly, the supporting surface may alternatively be a structure with a plurality of via holes at intervals and fixed holes.

With reference to FIGS. 1 to 4, at least one connector 1 is disposed on at least one supporting surface 21. It may be understood that one connector 1 may be correspondingly disposed on one supporting surface 21. Certainly, in other embodiments, the supporting surface 21 may have a mounting region with a size that is a plurality of times larger than a size of the connector 1. For example, the supporting surface 21 may be of a shape of a long strip or a square with a large area. In other words, a length and/or a width of the supporting surface 21 are/is large. In this case, a plurality of connectors 1 may be disposed on one supporting surface 21. For example, the plurality of connectors 1 are disposed side by side on one supporting surface 21. The connector 1 includes a support 12 and a locking gear 13. The locking gear 13 may be circular or the like.

The connector 1 includes a support 12 and a locking gear 13. The locking gear 13 may be circular or the like. The support 12 and a corresponding supporting surface 21 form a first limiting space 11, and the locking gear 13 is rotatably disposed in the first limiting space 11. The locking gear 13 is provided with a locking column 131. The locking column 131 may be disposed on a side of the locking gear 13 away from the supporting surface 21. The locking column 131 is configured to connect and adjust a direction of the lamp 3. The locking column 131 is fitted and fixed with a fixing hole of the lamp 3. It may be understood that an end of the support 12 is fixed on the supporting surface 21, and the other end of the support 12 is away from the supporting surface 21 and has a mounting surface, so that the mounting surface and the supporting surface 21 form the first limiting space 11. The support 12 may be a frame that is hollowed out in a middle portion, such as a right-angled "C" shape. Specifically, the lamp 3 may be provided with a fixing hole, and the locking column 131 is connected to the fixing hole. Alternatively, the lamp 3 is provided with a fixing column, and the locking gear 13 is provided with a locking hole. The fixing column and the locking hole fit with each other to achieve a detachable connection of the lamp 3.

During use, a user can choose different quantities of connectors 1 to satisfy users with different requirements for a quantity of the lamps 3. In addition, the several supporting surfaces 21 are located at different positions of the supporting base 2. The connector 1 can be mounted on different supporting surfaces 21 of the supporting base 2, so that the lamp 3 can be arranged in various arrangements and splicing modes, to form shapes of the lamp 3 with different placements and structures. Therefore, the multi-lamp splicing apparatus provided in the present embodiment has high compatibility. For example, a user can splice, based on requirements, different quantities of lamps, such as three, four, five, six, seven, or eight.

During assembly, the user can pre-configure a preset light emitting direction of a corresponding lamp 3, keep the preset light emitting direction of the lamp 3 fixed, and rotate the locking gear 13 until the locking gear 13 locks a light bar, so there is no need to rotate the light bar. Therefore, if the lamp 3 is expected to emit light in an expected direction, it only needs to pre-determine a light emitting direction, and then rotate the locking gear 13. This meets lighting requirements of the user for any light angle, and mounting efficiency is high and lighting is more flexible.

In addition, when the lamp 3 is mounted on the multi-lamp splicing apparatus, the lamp 3 and the locking gear 13 can be quickly assembled together by the locking column 131. The mounting mode is simple and fast, and the lamp 3 can be quickly mounted, thereby improving working efficiency.

Figure 5:
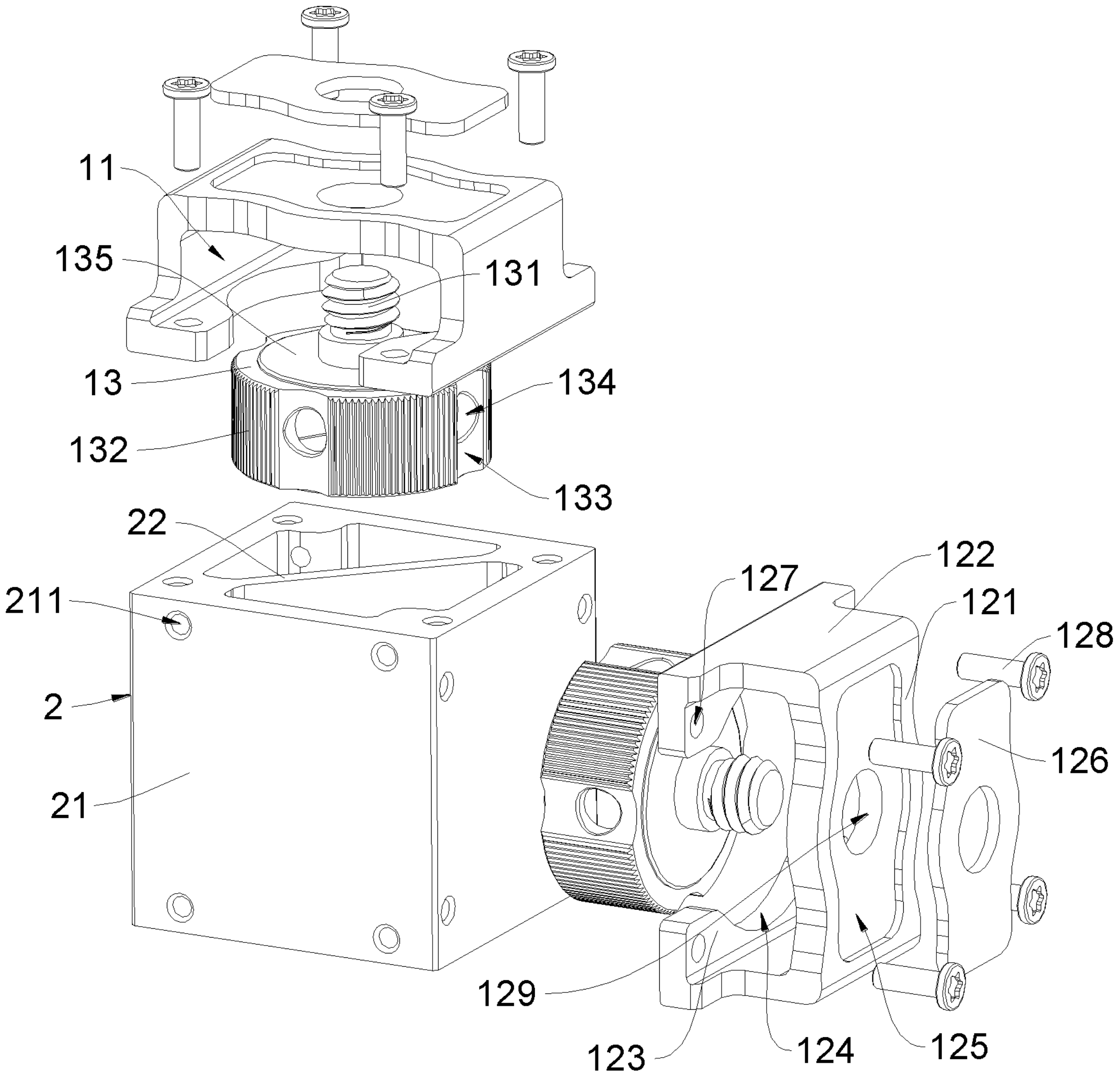
FIG. 5 is a schematic diagram of a decomposition state of a multi-lamp splicing apparatus with two connectors according to Embodiment 1 of the present disclosure.

FIG. 5 is a schematic diagram of a decomposition state of a multi-lamp splicing apparatus with two connectors 1. The supporting base 2 may be a hollow structure. For example, a center of the supporting base 2 is not solid, and a baffle 22 is disposed in a hollow region of the supporting base 2.

Preferably, refer to FIG. 5. The supporting base 2 is hollowed out from a top to a bottom to form a hollow structure, and the baffle 22 in the hollow region are specifically configured as a diagonal baffle 22. In this way, the supporting base 2 with the hollow structure can reduce weight of an overall splicing structure, and the baffle 22 is equivalent to a reinforcing rib that can increase strength of the overall splicing structure. Certainly, the baffle 22 may alternatively be provided with corresponding fixing holes for fixing with the connectors 1.

With reference to FIGS. 1 to 5, preferably, the supporting base 2 may be configured as a regular square prism with four circumferential side surfaces, one top surface and one bottom surface as the supporting surfaces 21. A size of each supporting surface 21 may be same.

Figure 2:
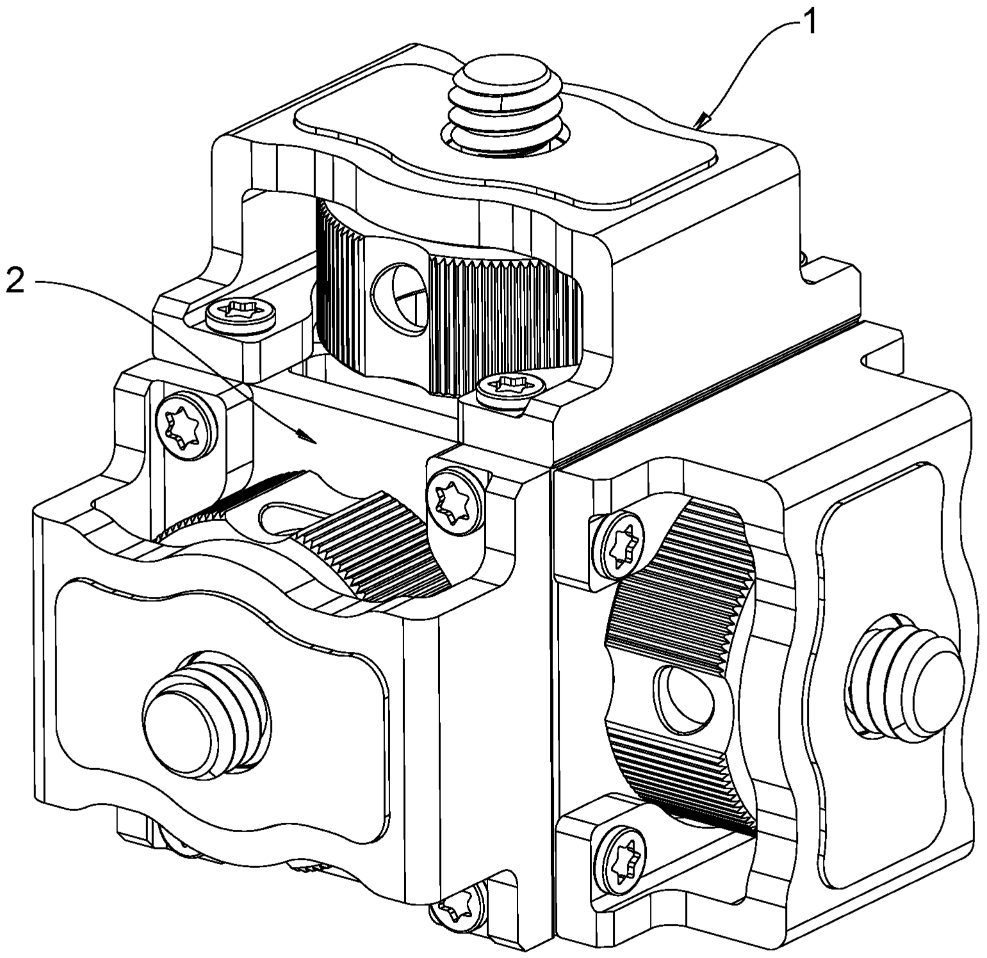
FIG. 2 is a schematic diagram of a multi-lamp splicing apparatus with three connectors according to Embodiment 1 of the present disclosure.
Figure 3:
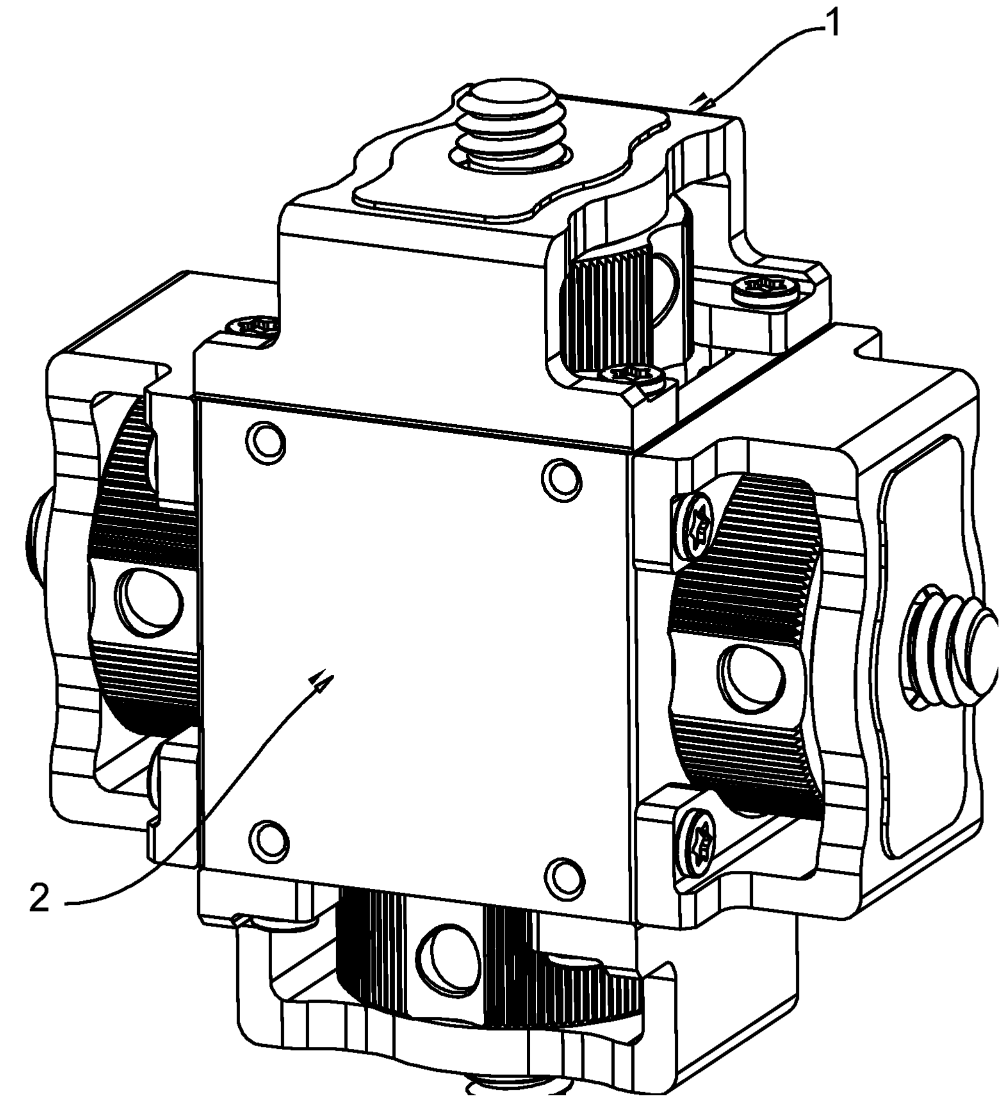
FIG. 3 is a schematic diagram of a multi-lamp splicing apparatus with four connectors according to Embodiment 1 of the present disclosure.
Figure 4:
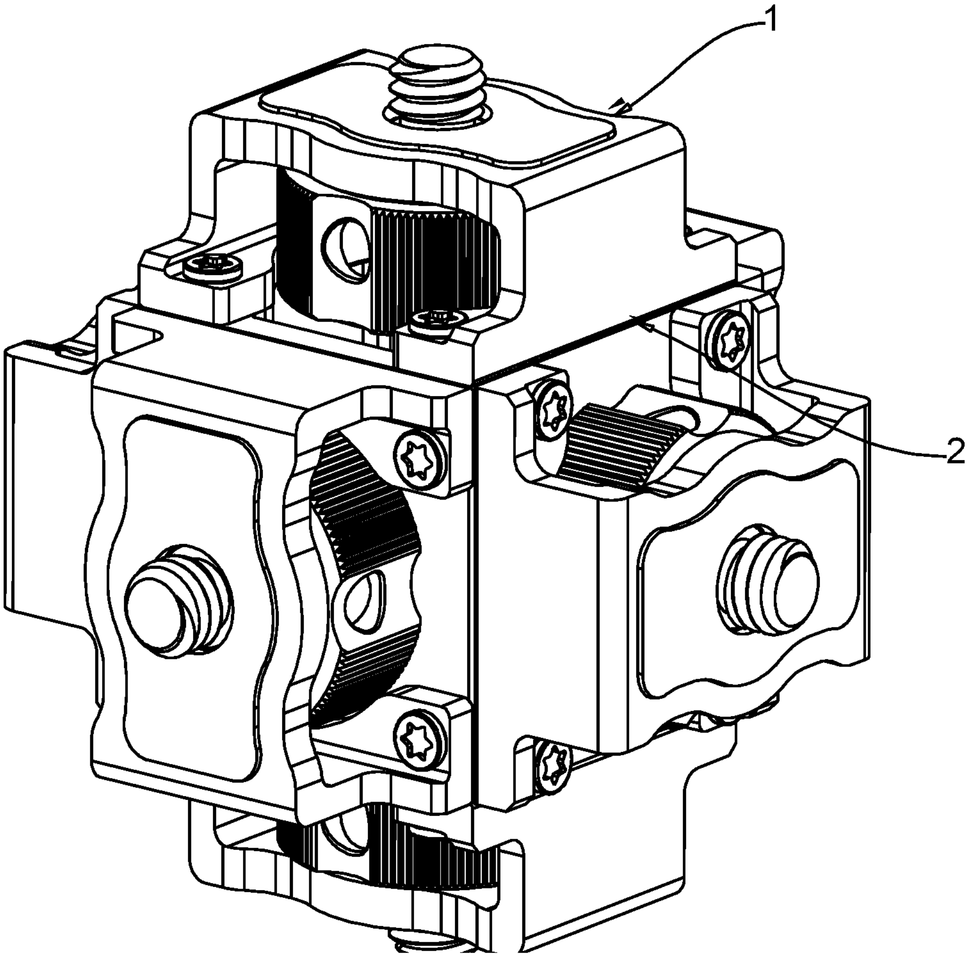
FIG. 4 is a schematic diagram of a multi-lamp splicing apparatus with six connectors according to Embodiment 1 of the present disclosure.

Refer to FIG. 1. When there are two connectors 1 in the multi-lamp splicing apparatus, both the two connector 1 may be disposed on respective circumferential side surfaces. Alternatively, one connector 1 is disposed on a circumferential side surface, and the other connector 1 is disposed on the top surface or the bottom surface. Alternatively, one connector 1 is disposed on the top surface, and the other connector 1 is disposed on the bottom surface. Refer to FIG. 2. When there are three connectors 1 in the multi-lamp splicing apparatus, the three connectors 1 may be disposed on respective circumferential side surfaces. Alternatively, two connectors 1 are disposed on respective circumferential side surface, and one connector 1 is disposed on the top surface or the bottom surface. Alternatively, a first connector 1 is disposed on the top surface, a second connector 1 is disposed on the bottom surface, and a third connector 1 is disposed on a circumferential side surface. Refer to FIG. 3. When there are four connectors 1 in the multi-lamp splicing apparatus, the four connectors 1 may be disposed on respective circumferential side surfaces. Alternatively, three connectors 1 are disposed on respective circumferential side surfaces, and the remaining one is disposed on the top surface or the bottom surface. Alternatively, two connectors 1 are disposed on respective circumferential side surfaces, and the remaining two are disposed on the top surface and the bottom surface respectively. Refer to FIG. 4. When there are six connectors 1 in the multi-lamp splicing apparatus, since a hexagonal prism has only six surfaces, the six connectors 1 are connected to six supporting surfaces 21 respectively.

Refer to FIGS. 1 to 5. The supporting surface 21 may be provided with first fixing holes 211. For example, a plurality of first fixing holes 211 may be provided at intervals along a circumferential direction of the supporting surface 21. The support 12 may be provided with second fixing holes 127, and the first fixing holes 211 correspond to the second fixing holes 127. For example, the second fixing holes 127 are provided at intervals along a circumferential direction of the support 12. The first fixing holes 211 and the second fixing holes 127 are detachably connected by fasteners 128. Quantities of the first fixing holes 211 and the second fixing holes 127 may be same. Optionally, the fasteners 128 may be specifically configured as bolts, screws, studs, or the like. In this way, a user can quickly assemble an overall splicing structure, thereby improving working efficiency of the assembly, and facilitating subsequent rapid maintenance.

Refer to FIG. 5. Each supporting surface (21) is provided with one connector 1. In this way, the supporting surface 21 is in one-to-one correspondence with the connector 1. The support 12 may include an abutting plate 121, a supporting plate 122, and a base 123. Two ends of the abutting plate 121 are connected to the supporting plate 122, and an end of the supporting plate 122 away from the abutting plate 121 is connected to the base 123. The abutting plate 121, the supporting plate 122, the base 123, and the supporting surface 21 form the first limiting space 11. There may be two supporting plates 122 and two bases 123. A preset included angle may be formed between each abutting plate 121 and each supporting plate 122. For example, the abutting plate and the supporting plate are perpendicular or roughly perpendicular to each other. A preset included angle may be formed between the supporting plate 122 and the base 123. For example, the supporting plate and the base is perpendicular or roughly perpendicular to each other. The abutting plate 121 may be parallel to the supporting surface 21. Therefore, two surfaces of the locking gear 13 may be parallel to the supporting surface 21 and the abutting plate 121 respectively, to facilitate 360° rotation of the locking gear 13 in the first limiting space 11.

Specifically, the second fixing holes 127 are provided on the base 123. There may be a plurality of second fixing holes 127, such as four. The plurality of second fixing holes 127 are provided at intervals and distributed along a circumferential direction of the abutting plate 121. In some embodiments, an outer contour of conjunctions of the base 123, the supporting plate 122, and the abutting plate 121 are designed with annular transitions, so that a risk of scratches when the user toggles the locking gear 13 can be reduced.

Refer to FIG. 5. A through hole 129 is provided in and runs through the abutting plate 121, and the locking column 131 passes through the through hole 129 and is threadedly connected to the lamp 3. In this way, the locking column 131 can pass through the through hole 129 and then be connected to the lamp 3. In this case, an interference between the locking column 131 and the abutting plate 121 can be effectively avoided. The locking column 131 of the locking gear 13 can pass through the through hole 129 and be exposed relative to the abutting plate 121, making it convenient for the user to mount the lamp 3 on the locking column 131.

Certainly, the locking gear 13 may also be provided with a locking hole, and the locking hole is located in a center of the locking gear 13 for assembly and fixation with a threaded column on the lamp 3. During assembly, a staff can thread the threaded column on the lamp 3 through the through hole 129 and then screw the threaded column into the locking hole to quickly mount and lock the lamp 3.

More importantly, when the lamp 3 is mounted, for a shorter lamp 3, if the user wants a corresponding lamp 3 to emit light in a preset direction, the user can rotate the lamp 3 to turn the preset direction and emit light in. However, for a longer or heavier lamp 3, it is undoubtedly difficult to rotate the lamp 3. In this case, the user can pre-set a preset light emitting direction of the corresponding lamp 3, keep the preset light emitting direction of the lamp 3 fixed, and rotate the locking gear 13 until the locking gear 13 locks a lamp stick, so there is no need to rotate the lamp stick, and the user can achieve light emitting in a specific direction of the lamp 3 only by rotating the locking gear 13. In this way, the light angle of the lamp 3 can be adjusted 360°, with a wide adjustment range, many application scenarios, and high practicability. In addition, the user can also rotate the lamp 3 and the locking gear 13 simultaneously to achieve fixation. This brings the user much freedom of choice.

In some embodiments, an end surface of the locking gear 13 facing the locking column 131 is provided with a step 135, and a size of the step 135 is larger than the locking column 131 and smaller than the locking gear 13. In this way, the disposing of the step 135 can make a contact area between the locking gear 13 and an inner wall of the abutting plate 121 during a rotation process smaller than a contact area without the step 135, thereby reducing a risk of scratching a surface of the support 12 (that is, the inner wall of the abutting plate 121) by textures during the locking process of the locking gear 13. In addition, when the lamp 3 is mounted, the rotation of the locking gear 13 is smoother and jamming is reduced, making a final fixation between the locking gear 13, the abutting plate 121 and the lamp 3 more stable. Optionally, the locking gear 13 may be a hollow structure, thereby reducing the weight of the entire splicing structure.

Refer to FIG. 5, an end of the base 123 facing the locking gear 13 is provided with an arc-shaped notch 124 to avoid the locking gear 13. It may be understood that the bases 123 on both sides can extend along a center of the abutting plate 121. The arc-shaped notch 124 can face the first limiting space 11, so the locking gear 13 can be limited and fixed in the first limiting space 11 and does not affect the rotation of locking gear 13. In this way, the locking gear 13 is effectively prevented from interfering with the base 123 during rotation and thus affecting the rotation of the locking gear 13. In addition, when the multi-lamp splicing apparatus is in an assembled state, the locking gear 13 is mounted between a pair of arc-shaped notches 124. This can effectively prevent the locking gear 13 from being detached from the support 12 while avoiding, thereby making a high structural stability.

Refer to FIG. 5, a groove 125 is provided on a side surface of the abutting plate 121 away from the locking gear 13. A gasket 126 is disposed in the groove 125. The gasket 126 is disposed surround the through hole 129 on the abutting plate 121. Preferably, the gasket 126 may be made of an elastic material, such as plastic or rubber. In this way, the disposing of the gasket 126 can increase contact friction between the lamp 3 and the abutting plate 121. When the lamp 3 is adjusted to the preset direction to emit light, the gasket 126 can effectively prevent the lamp 3 from causing a relative movement (that is, the rotation of the lamp 3) with the abutting plate 121, making the fixation of the lamp 3 more stable and reduces a probability of loosening after the lamp 3 and the abutting plate 121 are locked. In addition, after the lamp 3 and the locking gear 13 are locked, the gasket 126 abuts against the lamp 3. This can lock the lamp 3 to avoid rotation during lighting.

Refer to FIG. 5, a circumferential outer wall of the locking gear 13 is provided with friction patterns 132. The friction patterns 132 may extend along a thickness direction of the locking gear 13. In this way, the friction patterns 132 can increase friction force when the user operates, making it easier for the user to rotate the locking gear 13.

Refer to FIG. 5, several toggle grooves 133 are provided at intervals on the circumferential outer wall of the locking gear 13. The toggle grooves 133 may extend along an axial direction (the thickness direction) of the locking gear 13, and a quantity of the toggle grooves may be three, four, five, or the like. It may be further understood that in some embodiments, the toggle grooves 133 may be formed by recesses in an outer peripheral wall of the locking gear 13. Certainly, the toggle grooves 133 may also be formed by providing protrusions. For example, friction patterns 132 with different heights are provided, the highest friction patterns 132 and the lowest friction patterns 132 may form the toggle grooves 133, which is beneficial for users to use fingers to toggle the locking gear 13, effectively preventing the user's fingers from slipping, making the locking gear 13 bear large force, thereby improving stability of locking the lamp 3 and the connector 1.

In some embodiments, refer to FIG. 5, the toggle grooves 133 are provided with insertion holes 134. For example, each toggle groove 133 can be provided with the insertion hole 134. Certainly, the insertion holes 134 may also be provided in part of the toggle grooves 133. The insertion hole 134 may be used to insert an insertion rod, or the like. For example, the insertion rod may be a long rod that is convenient for the user to operate and bear force. The insertion rod inserts into the insertion hole 134 to toggle the locking gear 13 for rotation. In this way, the user can insert the insertion rod into the insertion hole 134 to toggle the locking gear 13 for rotation, and further lock the lamp 3 using a lever principle, further improving a locking performance of the multi-lamp splicing apparatus.

A quantity of insertion holes 134 may be two, three, four, or the like, and the plurality of insertion holes 134 may alternatively be connected to each other. It may be understood that for example, two opposite insertion holes 134 may be connected, and the connected insertion holes 134 can place insertion rod, such as a short rod with a length greater than a diameter of the locking gear 13. The rod can be different in length from the long rod rotated using the lever principle above, which can be retained inside the insertion hole 134 without holding the rod by the user. However, the length of the rod cannot be too long to affect the user to use, so when the lamp 3 is fixed, a shaft rod may be placed to effectively prevent the locking gear 13 from loosening.

Refer to FIG. 5. A distance between the abutting plate 121 and the supporting surface 21 is greater than a thickness of both locking gears 13. In this way, when the support 12 is fixed on the supporting surface 21, a large limiting space can be formed, a locking gear 13 is located in the limiting space. Inner walls of the locking gear 13 and the abutting plate 121 have gaps and can be rotated relative to the support 12, effectively preventing the locking gear 13 being stuck and not capable of rotating.

Refer to FIG. 5. A width of the abutting plate 121 is less than a width of the locking gear 13, allowing a portion of the locking gear 13 to leak out relative to the abutting plate 121, making it easier for the user to operate. Optionally, a width of a portion of the abutting plate 121 close to the supporting plate 122 is less than a width of a middle portion of the abutting plate 121. In this way, the width of the corresponding portion on the abutting plate 121 is smaller than a size of the locking gear, facilitating the user to use fingers to toggle the locking gear 13 without being shielded by the abutting plate 121 and improving operational comfort.

The present disclosure further provides a multi-lamp lighting device, including a lamp 3 a and multi-lamp splicing apparatus. The lamp 3 is connected to the locking column 131 or the locking hole. The lamp 3 may be a lamp stick, a small panel lamp, or the like. To facilitate the understanding of the mounting schematic diagram of a multi-lamp splicing apparatus on which a plurality of lamps 3 are mounted, FIGS. 6 to 9 are schematic diagrams of structures of the multi-lamp splicing apparatus with two, three, four or six connectors 1 on which the lamps 3 are mounted in sequence.

Figure 6:
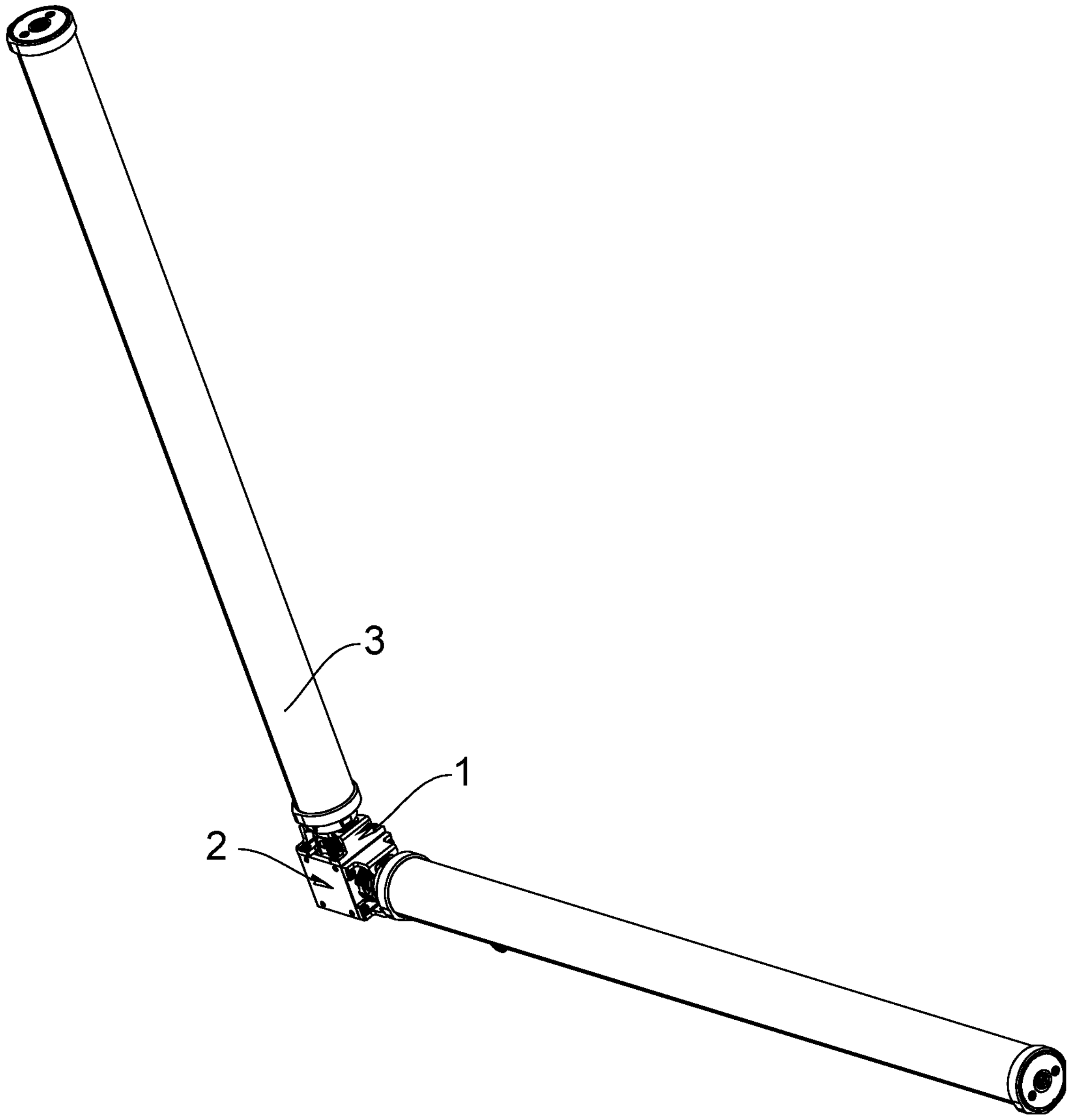
FIG. 6 is a schematic diagram of a multi-lamp splicing apparatus on which two lamps are mounted according to Embodiment 1 of the present disclosure.
Figure 7:
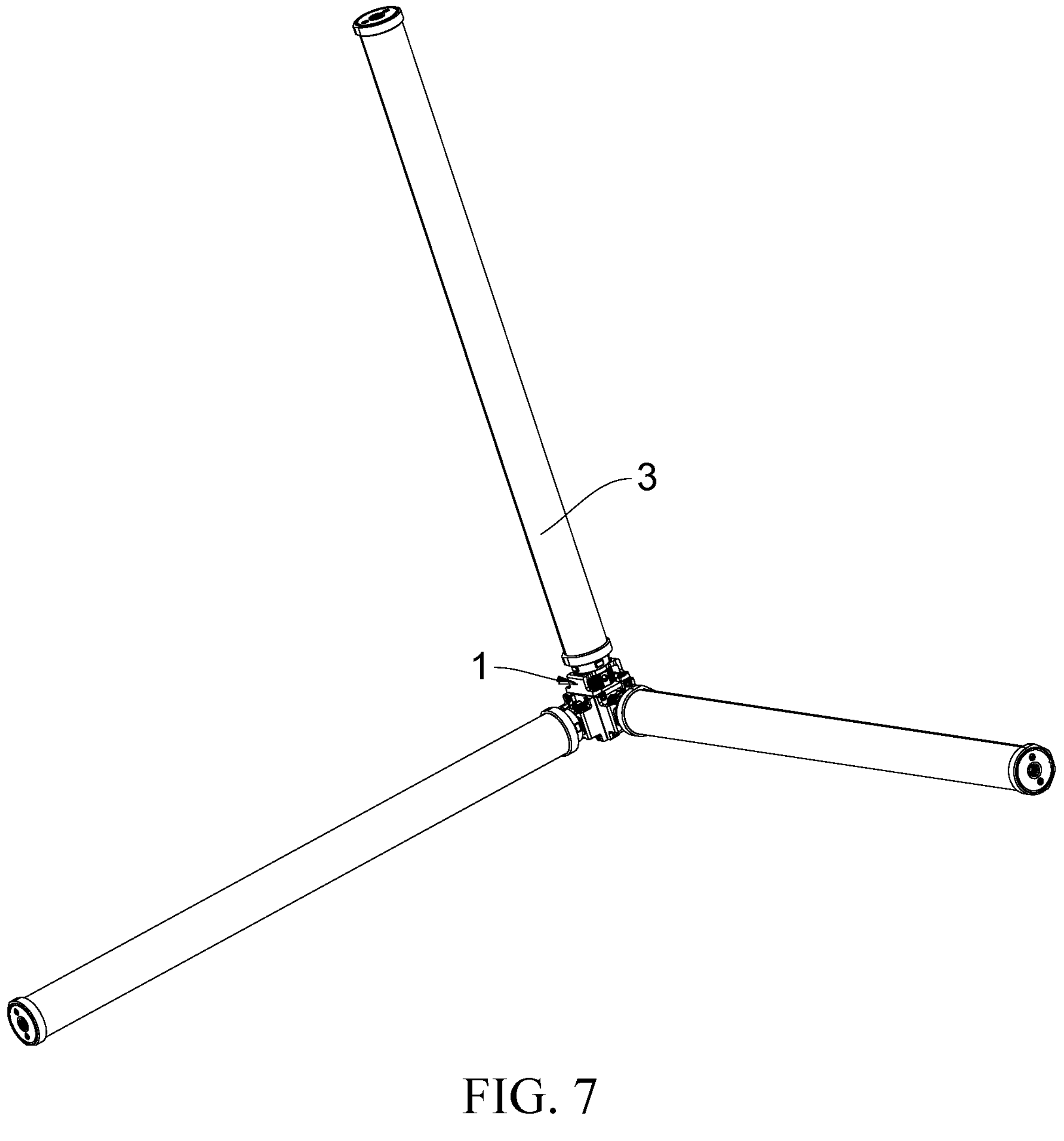
FIG. 7 is a schematic diagram of a multi-lamp splicing apparatus on which three lamps are mounted according to Embodiment 1 of the present disclosure.
Figure 8:
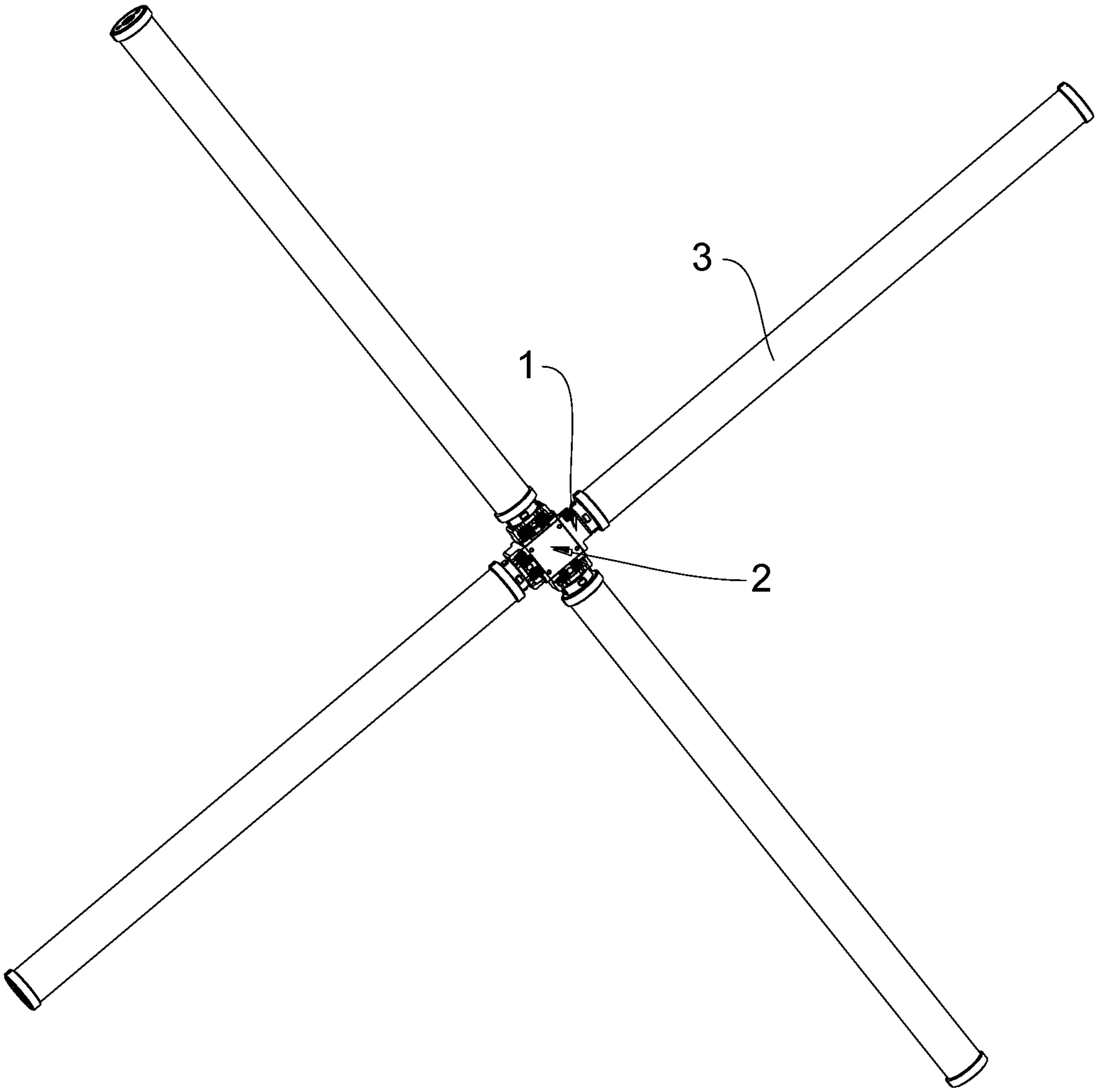
FIG. 8 is a schematic diagram of a multi-lamp splicing apparatus on which four lamps are mounted according to Embodiment 1 of the present disclosure.
Figure 9:
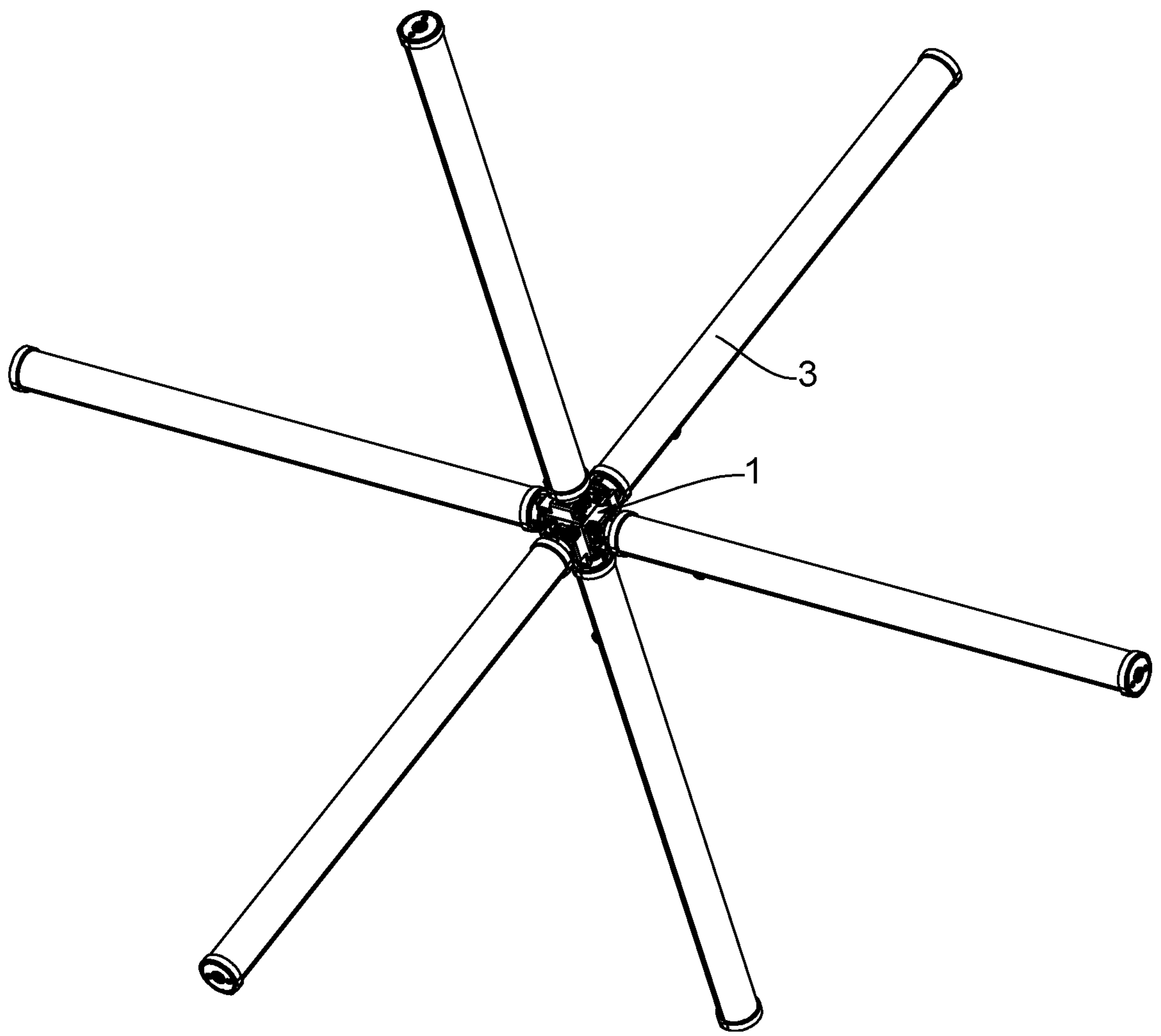
FIG. 9 is a schematic diagram of a multi-lamp splicing apparatus on which six lamps are mounted according to Embodiment 1 of the present disclosure.

Refer to FIG. 6. When there are two lamps 3 in the multi-lamp lighting device, both the two lamps 3 may be disposed on respective circumferential side surfaces. Alternatively, one lamp 3 is disposed on a circumferential side surface, and the other lamp 3 is disposed on a top surface or a bottom surface. Alternatively, one lamp 3 is disposed on the top surface, and the other lamp 3 is disposed on the bottom surface. Refer to FIG. 7. When there are three lamps 3 in the multi-lamp lighting device, the three lamps 3 may be disposed on respective circumferential side surfaces. Alternatively, two lamps 3 are disposed on respective circumferential side surfaces, and one lamp 3 is disposed on the top surface or the bottom surface. Alternatively, a first lamp 3 is disposed on the top surface, a second lamp 3 is disposed on the bottom surface, and a third lamp 3 is disposed on a respective circumferential side surface. Refer to FIG. 8. When there are four lamps 3 in the multi-lamp lighting device, the four lamps 3 may be disposed on respective circumferential side surfaces. Alternatively, three lamps 3 are disposed on respective circumferential side surfaces, and the remaining one lamp 3 is disposed on the top surface or the bottom surface. Alternatively, two lamps 3 are disposed on respective circumferential side surfaces, and the remaining two lamps 3 are disposed on the top surface and the bottom surface respectively. Refer to FIG. 9. When there are six lamps 3 in the multi-lamp lighting device, since a hexagonal prism has only six surfaces, six lamps 3 are connected to the six supporting surfaces 21 respectively.

In conclusion, refer to FIGS. 6 to 9, to facilitate self-assembly by a user, the user can splice different quantities of lamps 3, such as two, three, four, or six lamps, based on requirements of the user. In addition, mounting positions of different lamps 3 are not limited to mounting positions shown in FIGS. 6 to 9, and the user can flexibly adjust based on requirements of the user. Moreover, based on actual needs, the user can also use one of the locking columns 131 for mounting of a support column 4 convenient for the user to hold, while the other locking columns 131 are used for mounting of the lamp 3, so that the user can hold the entire lamp 3, making high practicality.

Embodiment 2

Figure 10:
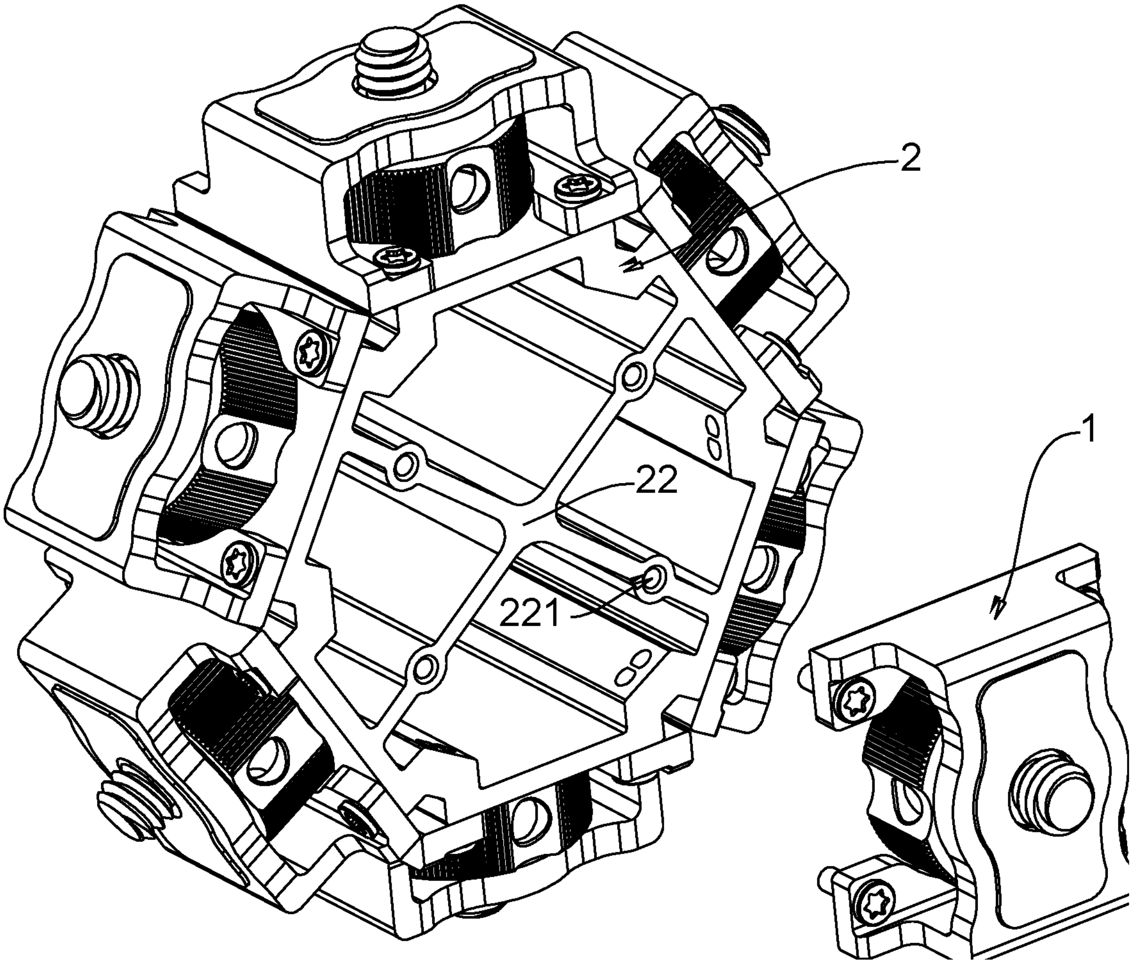
FIG. 10 is a schematic diagram of a multi-lamp splicing apparatus with eight connectors according to Embodiment 2 of the present disclosure.
Figure 11:
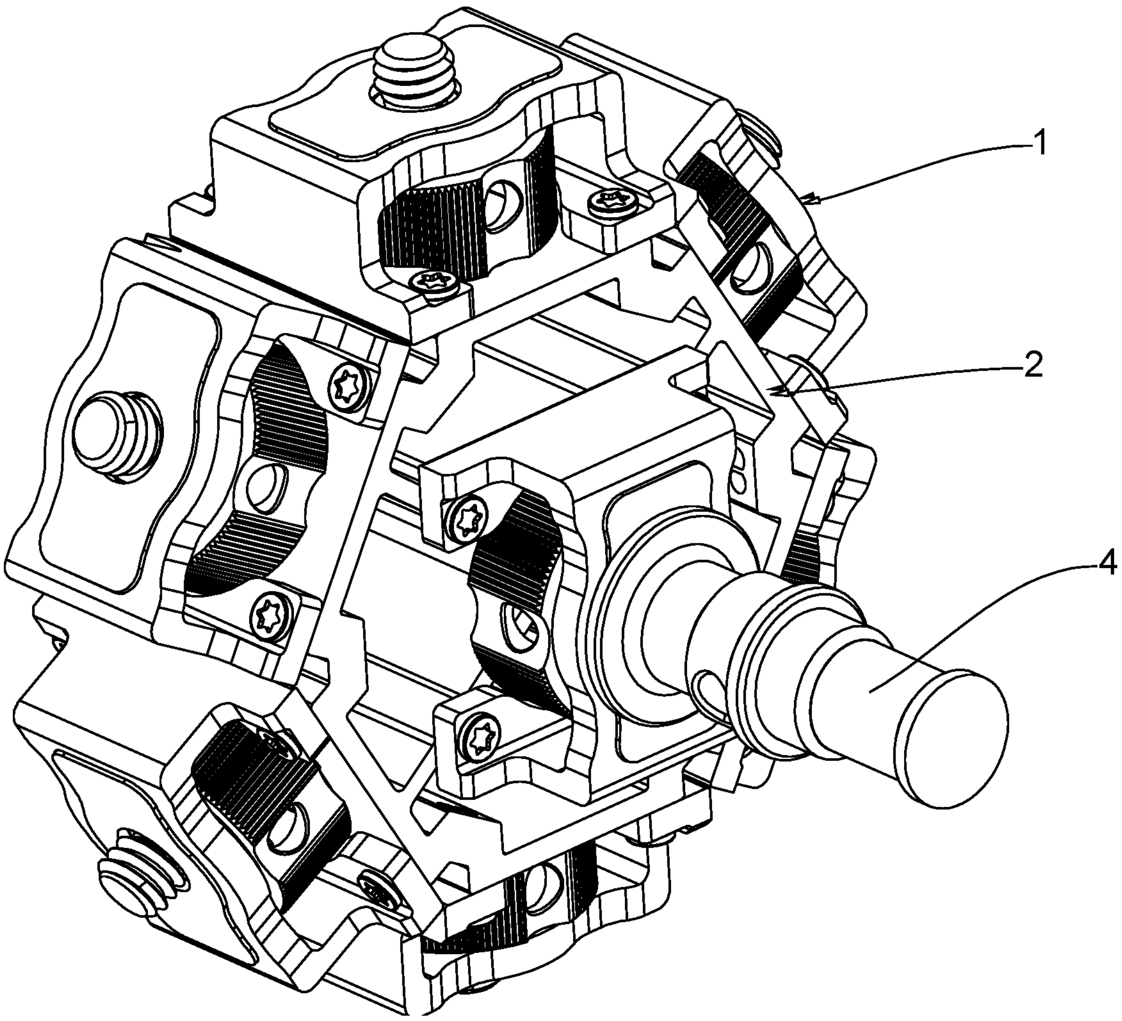
FIG. 11 is a schematic diagram of a multi-lamp splicing apparatus with eight connectors and connected to a support column according to Embodiment 2 of the present disclosure.
Figure 12:
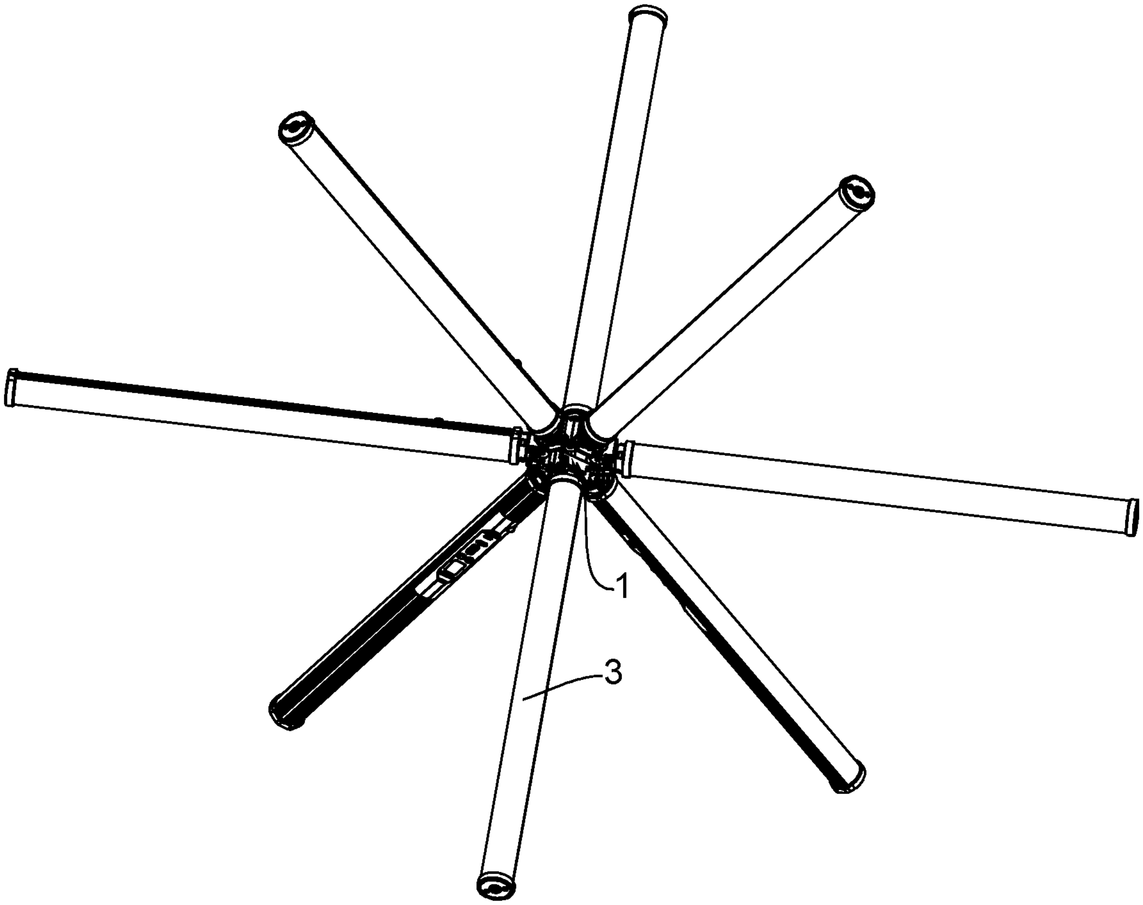
FIG. 12 is a schematic diagram of a multi-lamp splicing apparatus on which eight lamps are mounted according to Embodiment 2 of the present disclosure.

Embodiment 2 of the present disclosure specifically discloses a multi-lamp splicing apparatus, refer to FIGS. 10 to 12.

FIG. 10 is a schematic diagram of a structure of a multi-lamp splicing apparatus with eight connectors 1. Refer to FIG. 10. Compared with Embodiment 1, the support 12 is connected to the baffle 22, and a second limiting space is formed between the support and the baffle. The locking gear 13 is rotatably disposed in the second limiting space. Specifically, a pair of baffles 22 are disposed and are arranged to intersect, and may be specifically an X-shaped structure or a cruciform structure.

The supporting base 2 may be configured as a regular square prism with six circumferential side surfaces, one top surface and one bottom surface as the supporting surfaces 21. It can be learnt that the first limiting space 11 is located on the six circumferential side surfaces of the supporting base 2 and is distributed along a circumferential direction of the supporting base 2. The second limiting space is located on the top surface and bottom surface of the supporting base 2 and is distributed axially along the supporting base 2. An axis of the second limiting space and an axis of the first limiting space 11 are arranged at an included angle, for example, perpendicular to each other. It may be understood that the axis of the first limiting space 11 may be an axis of the locking gear 13 located inside the first limiting space (such as an axis of the locking column 131). The axis of the second limiting space may be an axis of the locking gear 13 located inside the second limiting space (such as the axis of the locking column 131), to be specific, the first limiting space 11 and the second limiting space formed by the baffle 22 face different directions respectively.

Optionally, a pair of baffles 22 are provided with third fixing holes 221 for detachably connecting with second fixing holes 127 of the support 12 by fasteners 128. In this way, even if there is a hollow structure on the supporting base 2, the connector 1 can still be mounted on the supporting base 2 by disposing the baffle 22 and the third fixing holes 221, making reasonable use of a hollow region to avoid a problem of not being capable of mounting the connector 1 due to the hollow structure.

FIG. 11 is a schematic diagram of a structure of a multi-lamp splicing apparatus with eight connectors 1, one of the connectors 1 is connected to a support column 4. Refer to FIG. 11. A user can also mount according to actual requirements of the user, one of the locking columns 131 with the support column 4 that is easy for the user to hold, while the other locking columns 131 are mounted with a lamp 3 to hold the entire lamp 3, making high practicality.

FIG. 12 is a schematic diagram of a structure of a multi-lamp splicing apparatus with eight connectors 1 on which a lamp 3 is mounted. Refer to FIG. 12. When there are eight lamps 3 in the multi-lamp lighting device, the eight lamps 3 are correspondingly connected to eight supporting surfaces 21 respectively. In this way, a user can splice eight lamps 3 based on requirements of the user.

In conclusion, the multi-lamp splicing apparatus provided in the present disclosure have the following technical effects:

(1) During use, a user can choose different quantities of connectors 1 to satisfy users with different requirements for the quantity of lamps 3. In addition, the connector 1 can be mounted on different supporting surfaces 21 of a supporting base 2, so that the lamp 3 can be arranged in various different arrangements and splicing modes, to form shapes of the lamp 3 with different placements and structures, making high compatibility. For example, a user can splice, based on requirements, different quantities of lamps, such as three, four, five, six, seven, or eight.

(2) During assembly, the user can quickly and easily mount the lamp 3 on the locking gear 13 by the locking column 131. The user can quickly adjust a light angle of the lamp 3 by rotating the locking gear 13 to meet the user's requirements for different light angles, making high practicality.

(3) In addition, when the lamp 3 is mounted on the multi-lamp splicing apparatus, the lamp 3 and the locking gear 13 can be quickly assembled together through the locking column 131. The mounting mode is simple and fast, and the lamp 3 can be quickly mounted, thereby improving work efficiency.

The technical means disclosed in the present disclosure solutions are not limited to the technical means disclosed in the foregoing implementations, but also include technical solutions including any combination of the foregoing technical features. It should be noted that a person of ordinary skill in the art may make various improvements and modifications without departing from the principle of the present disclosure. All such improvements and modifications shall also fall within the protection scope of the present disclosure.

What is claimed is:

1. A multi-lamp splicing apparatus, comprising:

a supporting base provided with several supporting surfaces; and a connector disposed on at least one of the supporting surfaces, wherein the connector comprises a support and a locking gear;

the support and the corresponding one of the supporting surfaces form a first limiting space, and the locking gear is rotatably disposed in the first limiting space; and the locking gear is provided with a locking column for connecting a lamp;

wherein the supporting base is a hollow structure, a baffle is disposed in a hollow region of the supporting base, the support is connected to the baffle, and a second limiting space is formed between the support and baffle, wherein the locking gear is rotatably disposed in the second limiting space, and an included angle is formed between an axis of the second limiting space and an axis of the first limiting space.

2. The multi-lamp splicing apparatus as claimed in claim 1, wherein each of the supporting surfaces is provided with first fixing holes, the support is provided with second fixing holes, and the first fixing holes and the second fixing holes are detachably connected by fasteners.

3. The multi-lamp splicing apparatus as claimed in claim 1, wherein the baffle is provided with third fixing holes for detachably connecting with second fixing holes of the support by fasteners.

4. The multi-lamp splicing apparatus as claimed in claim 1, wherein each of the supporting surfaces is provided with one said connector;

the support comprises an abutting plate, a supporting plate, and a base;

two ends of the abutting plate are connected to the supporting plate, and an end of the supporting plate away from the abutting plate is connected to the base;

the abutting plate, the supporting plate, the base, and the supporting surface form the first limiting space; and a through hole is provided in and runs through the abutting plate, and the locking column passes through the through hole and is configured to be threadedly connected to the lamp.

5. The multi-lamp splicing apparatus as claimed in claim 4, wherein an end surface of the locking gear facing the locking column is provided with a step, and a size of the step is larger than the locking column and smaller than the locking gear.

6. The multi-lamp splicing apparatus as claimed in claim 4, wherein a groove is provided on a side surface of the abutting plate away from the locking gear, a gasket is disposed in the groove, and the gasket is disposed around the through hole on the abutting plate.

7. The multi-lamp splicing apparatus as claimed in claim 4, wherein an end of the base facing the locking gear is provided with an arc-shaped notch, and the arc-shaped notch faces the first limiting space to avoid the locking gear.

8. The multi-lamp splicing apparatus as claimed in claim 4, wherein a width of the abutting plate is less than a width of the locking gear, and wherein a width of a portion of the abutting plate close to the supporting plate is less than a width of a middle portion of the abutting plate.

9. The multi-lamp splicing apparatus as claimed in claim 1, wherein several toggle grooves are provided at intervals on a circumferential outer wall of the locking gear; and each of the toggle grooves is provided with an insertion hole, and the insertion hole is used for placement of an insertion rod, to enable the insertion rod to be inserted into the insertion hole to toggle the locking gear for rotation.

10. A multi-lamp lighting device, comprising a lamp;

a supporting base provided with several supporting surfaces; and a connector disposed on at least one of the supporting surfaces, wherein the connector comprises a support and a locking gear;

the support and the corresponding one of the supporting surfaces form a first limiting space, and the locking gear is rotatably disposed in the first limiting space;

the locking gear is provided with a locking column for connecting the lamp; and the lamp is connected to the locking column;

wherein the supporting base is a hollow structure, a baffle is disposed in a hollow region of the supporting base, the support is connected to the baffle, and a second limiting space is formed between the support and baffle, wherein the locking gear is rotatably disposed in the second limiting space, and an included angle is formed between an axis of the second limiting space and an axis of the first limiting space.

11. The multi-lamp lighting device as claimed in claim 10, wherein each of the supporting surfaces is provided with first fixing holes, the support is provided with second fixing holes, and the first fixing holes and the second fixing holes are detachably connected by fasteners.

12. The multi-lamp lighting device as claimed in claim 10, wherein the baffle is provided with third fixing holes for detachably connecting with second fixing holes of the support by fasteners.

13. The multi-lamp lighting device as claimed in claim 10, wherein each of the supporting surfaces is provided with one said connector;

the support comprises an abutting plate, a supporting plate, and a base;

two ends of the abutting plate are connected to the supporting plate, and an end of the supporting plate away from the abutting plate is connected to the base;

the abutting plate, the supporting plate, the base, and the supporting surface form the first limiting space; and a through hole is provided in and runs through the abutting plate, and the locking column passes through the through hole and is configured to be threadedly connected to the lamp.

14. The multi-lamp lighting device as claimed in claim 13, wherein an end surface of the locking gear facing the locking column is provided with a step, and a size of the step is larger than the locking column and smaller than the locking gear.

15. The multi-lamp lighting device claimed in claim 13, wherein a groove is provided on a side surface of the abutting plate away from the locking gear, a gasket is disposed in the groove, and the gasket is disposed around the through hole on the abutting plate.

16. The multi-lamp lighting device as claimed in claim 13, wherein an end of the base facing the locking gear is provided with an arc-shaped notch, and the arc-shaped notch faces the first limiting space to avoid the locking gear.

17. The multi-lamp lighting device as claimed in claim 13, wherein a width of the abutting plate is less than a width of the locking gear, and wherein a width of a portion of the abutting plate close to the supporting plate is less than a width of a middle portion of the abutting plate.

18. The multi-lamp lighting device as claimed in claim 10, wherein several toggle grooves are provided at intervals on a circumferential outer wall of the locking gear; and each toggle groove is provided with an insertion hole, and the insertion hole is used for placement of an insertion rod, to enable the insertion rod to be inserted into the insertion hole to toggle the locking gear for rotation.

* * * * *